United States Patent [19]

Elward-Berry

[11] Patent Number: 5,620,947
[45] Date of Patent: Apr. 15, 1997

[54] WATER-BASED HIGH TEMPERATURE WELL SERVICING COMPOSITION AND METHOD OF USING SAME

[75] Inventor: Julianne Elward-Berry, Houston, Tex.

[73] Assignee: Exxon Production Research Company, Houston, Tex.

[21] Appl. No.: 364,341

[22] Filed: Dec. 27, 1994

[51] Int. Cl.$^6$ ................................................. C09K 7/00
[52] U.S. Cl. ........................ 507/229; 507/925; 507/214; 507/906; 507/225
[58] Field of Search ................................... 507/214, 906, 507/925

[56] References Cited

U.S. PATENT DOCUMENTS

| | | | |
|---|---|---|---|
| 4,175,042 | 11/1979 | Mondshine | 252/8.55 |
| 4,186,803 | 2/1980 | Mondshine | 166/292 |
| 4,422,947 | 12/1983 | Dorsey et al. | 252/8.5 |
| 4,547,299 | 10/1985 | Lucas | 252/8.5 |
| 4,621,692 | 11/1986 | Mondshine | 166/281 |
| 4,629,575 | 12/1986 | Weibel | 252/8.551 |
| 5,008,025 | 4/1991 | Hen | 252/8.51 |
| 5,080,809 | 1/1992 | Stahl et al. | 252/8.54 |
| 5,179,076 | 1/1993 | Elward-Berry | 507/112 |
| 5,244,877 | 9/1993 | Elward-Berry | 507/112 |

FOREIGN PATENT DOCUMENTS

0224474B1  9/1991  European Pat. Off. .

OTHER PUBLICATIONS

*Unique Completion Fluid Suits Horizontal Wells*, by Jay Dobson and T. C. Mondshine, Petroleum Engineer International, Sep., 1990.

*Cellulon Fiber Specification*, Copyright 1990 by Weyerhaeuser Company.

*Rheological Characteristics of Reticulated Bacterial Cellulose as a Perfomance Additive to Fracturing and Drilling Fluids*, by J. A. Westland and D. A. Lenk, Society of Petroleum Engineers, SPE 25204. 1993.

*New Polymer Improves Water–Soluble Completion Fluids*, by T. C. Mondshine, Petroleum Engineer International, Feb. 1989.

Primary Examiner—Sharon Gibson
Assistant Examiner—Valerie Fee
Attorney, Agent, or Firm—Gary D. Lawson

[57] ABSTRACT

A water-based well completion and workover fluid is disclosed which has improved rheological and filtration control properties at temperatures up to about 450° F. The composition comprises a saturated brine solution, a sized-salt that is insoluble in the saturated brine solution, and a water-soluble filtration additive comprising a polymer produced from at least two monomers selected from the group consisting of 2-acrylamido-2-methylpropanesulfonate, acrylamide, and 2-vinylpyrrolidone.

2 Claims, No Drawings

5,620,947

WATER-BASED HIGH TEMPERATURE WELL SERVICING COMPOSITION AND METHOD OF USING SAME

FIELD OF THE INVENTION

This invention relates to a new water-based fluid and process for use in wellbores drilled for recovery and processing of natural resources.

BACKGROUND OF THE INVENTION

Various procedures have been used to increase the flow of hydrocarbons from hydrocarbon-containing subterranean formations penetrated by wellbores. A commonly used technique involves perforating the formation to provide flow channels through which hydrocarbons flow from the formation to the wellbore. The goal is to leave the formation with maximum permeability or conductivity so that formation hydrocarbons flow to the wellbore with the least possible restriction. This can be accomplished by (1) preventing the entry of solids into the formation, which could decrease the permeability of the formation, (2) using well completion fluids that do not tend to swell and/or disperse formation particles contacted by the completion fluid, (3) preventing the entry of formation particles into the perforations, and (4) avoiding excessive invasion of wellbore fluids into the formation.

Specially formulated fluids are used in connection with completion and workover operations to minimize damage to the formation. Completion fluids are used after drilling is complete and during the steps of completion, or recompletion, of the well, such as cementing the casing, perforating the casing, and setting the tubing and pump. Workover fluids are used during remedial work in the well, such as removing tubing, replacing a pump, logging, reperforating, and cleaning out sand or other deposits.

Formation damage from solids and filtrate invasion may be minimized by treating the well in a near-balanced condition (wellbore pressure close to formation pressure). In high-pressure wells, however, it is often necessary to treat the well in both overbalanced or underbalanced conditions. If overbalanced, the treating fluids are designed to temporarily seal the perforations to prevent entry of fluids and solids into the formation, and if underbalanced, the treating fluids are designed to prevent entry of solids from the formation into the wellbore. Many such treating fluids are brine-based. Such overbalanced treating fluid is sometimes referred to as a "kill weight" fluid.

The brine composition for a particular application generally depends on four basic considerations: (1) brine concentration—to prevent clay swelling and dispersion, (2) fluid density—to provide formation pressure control, (3) viscosity—to achieve desired solids-carrying capacity, and (4) fluid loss control—to prevent excessive loss of fluid from the wellbore to the formation.

The brine concentration and fluid density are selected based on area experience and knowledge of well properties. Minimum brine concentration to prevent clay reactions in most formations is generally considered to be 5% to 10% for sodium chloride and 1% to 3% for calcium and potassium chloride brines.

Effective viscosity and fluid loss control for temperatures below about 350° F. have been achieved by the addition of polymers to the brine. Various chemicals are added to obtain the desired effects, including for example carboxymethyl cellulose, hydroxyethyl cellulose, xanthan gum, guar gum, and hydroxypropyl guar gum.

In conjunction with polymers for fluid loss control, bridging agents have been added to the brine to form a bridge on the formation face to prevent fluid loss. The primary advantage of controlling fluid loss is the ability to prevent particle plugging of the near-wellbore permeability by placing the polymer-bridging particle "filter" on the formation face. Preferably the wellbore fluid (completion fluid and workover fluid) is designed so that solids bridge on the surface of the formation rock rather than inside the formation pores. This bridging, which is referred to as "filtration control," controls the escape of the liquid part of the fluid into the permeable formations. Excessive fluid loss from the workover and completion fluid may contaminate the producing formation, permanently displacing oil and gas and blocking production. This fluid loss problem is greatly increased at high temperatures and pressures encountered in deep wells.

While several completion and workover fluids for filtration control have been suggested, one promising composition uses brines containing water-soluble salts in particulate size, sometimes called "sized-salt." This technique has an advantage in that after the workover or completion operation is completed, the bridging material can be dissolved by circulating a flesh-water pill. The principal disadvantage is that polymer products used to suspend the salt particles and to supplement the bridging of salt particles are not temperature stable at temperatures above about 300° F. These higher temperatures can cause breakdown of viscosifiers and filtration control additives. For example, starch and xanthan gum degrade at about 225° F. to 250° F., carboxymethyl cellulose and guar gum degrade at about 250° F. to 300° F., and lignosulfonates begin to degrade at about 250° F. and are particularly unstable above about 325° F. Without adequate filtration control, formation damage can result.

The search for oil and gas has led to the drilling of deeper wells in recent years. Because of the temperature gradient in the earth's crust, deeper wells have higher bottomhole temperatures. A good workover and completion fluid should be rheologically stable over the entire range of temperatures to which it will be exposed, in order to suspend the particulate filtration and bridging additives. In deep wells, this can exceed 450° F.

There is a need for an improved wellbore fluid, particularly for completion and workover operations in overbalanced conditions, that can substantially reduce fluid loss into reservoirs above 350° F.

SUMMARY OF THE INVENTION

The combined additives of the invention impart high temperature stability and high pressure and high temperature filtration control characteristics to an aqueous non-clay wellbore fluid. The water-based well completion and workover fluid of this invention has improved rheological and filtration control properties at temperatures up to about 450° F. The composition comprises a saturated brine solution such as potassium chloride, sodium chloride, calcium chloride, sodium sulfate, sodium carbonate, sodium bicarbonate, calcium bromide, sodium bromide, potassium bromide, magnesium bromide, magnesium chloride, potassium carbonate, potassium bicarbonate, potassium formate, cesium formate, cesium chloride, or mixtures thereof; a sized-salt that is insoluble in the saturated brine solution, examples of which include potassium chloride, sodium chloride, calcium chloride, sodium sulfate, sodium carbonate, sodium bicarbonate, calcium bromide, sodium bromide, potassium bromide, magnesium bromide, magnesium chloride, potassium carbonate, potassium bicarbonate, cesium chloride, cesium formate, potassium formate, or mixtures thereof; and a water-soluble filtration additive comprising a polymer composition produced from at least two of the following monomers: 2-acrylamido-2-methylpropanesulfonate, acrylamide, and 2-vinylpryrrolidone.

The composition of the invention preferably further comprises a cellulosic material as a viscosifier and suspension additive. Examples of such cellulosic material comprise parenchymal cell cellulose or a bacterial cellulose produced in a fermentation process using a strain of *Acetobacter*.

A preferred treating fluid composition for well completion and workover comprises a saturated brine selected from the group consisting of NaCl, NaBr, KCl, KBr, CaCl$_2$, CaBr$_2$, or Na$_2$SO$_4$; a water soluble fine sized-salt selected from the group consisting of NaCl, NaBr, KCl, KBr, CaCl$_2$, CaBr$_2$, or Na$_2$SO$_4$, present in the range of 20 to 200 pounds per barrel of brine; a suspension additive comprising parenchymal cell cellulose or temperature-stable viscosifying bacterial cellulose products, present at a concentration of 1 to 12 pounds per barrel of brine; a filtration additive comprising a terpolymer produced from monomers of 2-acrylamido-2-methylpropanesulfonate, acrylamide, and 2-vinylpryrrolidone, present in a concentration of 1 to 20 pounds per barrel of brine; and a buffer for pH control, present at a concentration from 2 to 10 pounds per barrel of brine, such as MgO, MgCl$_2$, Na$_2$CO$_3$.

It is an object of this invention to provide a treating fluid for viscosity and filtration control in well workover and well completion operations that is effectively insensitive to comparatively high borehole temperatures and pressures up to about 450° F. Other objects and advantages of the present invention will be appreciated by those skilled in the art from a reading of the description, examples, and claims which follow.

DETAILED DESCRIPTION OF THE INVENTION

In this invention a wellbore fluid has been discovered that can be rheologically stable at the high temperatures of deep subterranean formations. The wellbore fluid can be used as a circulating fluid in drilling of horizontal wells where formation damage from clay-base fluids could be extensive across the large exposed payzone. The wellbore fluid is preferably used as a non-circulating fluid in workover and completion operations and is effective for use at well temperatures above 400° F. This high temperature stability is created from the synergistic combination of essential components of the wellbore treating fluid. The components comprise a saturated brine solution, a soluble sized salt that is insoluble in saturated brine solution, and a water-soluble filtration additive comprising a polymer produced from at least two monomers selected from the group consisting of 2-acrylamido-2-methylpropanesulfonate, acrylamide, and 2-vinylpyrrolidone. The wellbore fluid is effective for temporary bridging and plugging of productive formations so that clean up can be effected by circulating connate water, field brine, or unsaturated brine solutions in the wellbore.

The saturated brine solution of the invention may be formed by dissolving a mixture of salts in water. Any water soluble salt may be used. Non-limiting examples include potassium chloride, sodium chloride, calcium chloride, sodium sulfate, sodium carbonate, sodium bicarbonate, calcium bromide, sodium bromide, potassium bromide, magnesium bromide, and potassium carbonate, potassium formate, cesium formate, or any mixture of the above salts which will form a saturated brine solution may be used in the invention. Potassium chloride and sodium chloride are preferred for low to moderate density fluids, due to their availability and cost. For higher density fluids, cesium formate can be used.

The water insoluble salt used in the wellbore composition of this invention can include a single water-soluble salt or mixtures of water-soluble salt which are insoluble in saturated brine solution. Preferred salts are those selected from the group comprising potassium chloride, sodium chloride, calcium chloride, sodium sulfate, sodium carbonate, sodium bicarbonate, calcium bromide, sodium bromide, potassium bromide, magnesium bromide, and potassium carbonate, or any mixture of such salts. Potassium chloride and sodium chloride are particularly preferred due to their availability and cost.

The particle size of the salt in the saturated brine solution should range from about 5 microns to about 100 microns. The amount of sized salt to be added to the saturated brine solution will vary depending on the temperature at which the invention is to be used. Generally, the amount of sized-salt, or mixture thereof, will be greater for high temperature wells (450° F.) since sized-salt is more soluble in the brine at higher temperatures. In most applications of the invention, the amount of sized-salt, or mixtures thereof, added to the saturated brine solution will range from about 10 pounds per barrel of brine to about 100 pounds per barrel of brine, although more than 100 pounds per barrel could be necessary in some circumstances.

The brine solution may be prepared at the rig site or at an off-site location. The amount of brine introduced into a wellbore will vary depending upon the temperature and pressure of the well, and other factors such as the salinity of the brine, the amount of additives to be added to the brine, and the weight of the brine.

The composition of this invention preferably further comprises a thermally stable cellulosic material. Examples of suitable cellulosic materials include parenchymal cell cellulose (PCC) or a bacterial cellulose produced by an agitated, aerobic fermentation process using a strain of *Acetobacter*, or mixtures of the two cellulosic materials are examples. The amount of cellulosic material used preferably ranges from about 1 to 12 pounds per barrel of saturated brine. In the preferred embodiment, presheared PCC should be used in a concentration of 1 to 3 pounds per barrel. Preshearing of the PCC is best accomplished in the laboratory by mixing 20 to 25 pounds per barrel of PCC with fresh water or sea water, then using a laboratory grade blender at high speed for 15 to 30 minutes until the yield point of the slurry is at least about 70 to 100 lb./100 ft$^2$. (at 120° F.) as measured by the yield point test described by Recommended Practice RP 13B-1 (1st ed. Jun. 1, 1990) of the Recommended Practice Standard Procedure for Field Testing Water-Based Drilling Fluids of the American Petroleum Institute. Processes for using PCC in water-based drilling fluids are disclosed in U.S. Pat. Nos. 5,244,877 and 5,179,076. For applications in the field, PCC is best presheared by mixing 20 to 25 lb./bbl. PCC with fresh water or sea water, then circulating this slurry through a colloid mill or modified homogenizer pump for a minimum of two hours, until the yield point of the slurry is at least about 70 to 100 lb /100 ft$^2$ (at 120° F.), as measured by the yield point test described by Recommended Practice RP 13B-1 (1st ed. Jun. 1, 1990) of the Recommended Practice Standard Procedure for Field Testing Water-Based Drilling Fluids of the American Petroleum Institute.

The bacterial cellulose is produced by an agitated, aerobic fermentation process using a strain of *Acetobacter*. The process for making this polymeric material is known to those skilled in the art. Refer, for example, to the Society of Petroleum Engineer paper, SPE 25204, entitled "Rheological Characteristics of Reticulated Bacterial Cellulose as a Performance Additive to Fracturing and Drilling Fluids," by Westland, et al., March, 1993.

A water soluble filtration control additive used in the invention to control loss of fluids used in completion or workover activities beyond the bridging capability of the sized salt. The filtration control additive comprises a polymer composition produced from at least two monomers selected from the group consisting of 2-acrylamido-2-methylpropanesulfonate, acrylamide, and 2-vinylpyrrolidone. These are known monomers and can be produced as known in the art. See for example U.S. Pat. No. 5,080,809 for a general description of how to produce such polymers.

The amount of filtration additive needed will vary depending upon the particular type of brine used, the weight of the completion or workover fluid, the temperature and pressure in the wellbore. Generally, the optimum amount of the additive mixture will be in the range from about 1 to about 20 pounds per barrels of fluid, preferably 3 to 7 pounds per barrels of fluid. Economic considerations and rheological and filtration properties will normally determine the upper limit. Commercially available testing techniques may be used at the well site to determine the amount of filtration control additives to use for effective filtration control. Those skilled in the art can determine the amount of filtration control additive to be used by suitable experiments in light of this disclosure.

The treating composition of this invention preferably includes a buffer to ensure that the composition does not become acidic. Acidity can cause degradation of some of the polymers used in the inventive composition. The workover and completion fluid of the invention preferably includes a water-soluble base selected from the group comprising alkali and alkaline earth metal hydroxides, ammonium hydroxide, alkali metal carbonates and chemical buffer salts which dissolve with hydrolysis to yield alkaline fluids, such as sodium phosphate, sodium borates and sodium silicates, or combinations of at least two such bases.

The treating fluid components of this invention may be added to the brine as individual components or may be pre-blended as a ready-mix.

A preferred treating fluid composition for well completion and workover comprises a saturated brine, selected from the group consisting of NaCl, NaBr, KCl, KBr, $CaCl_2$, $CaBr_2$, and $Na_2SO_4$;

a water soluble fine sized-salt selected from the group consisting of NaCl, NaBr, KCl, KBr, $CaCl_2$, $CaBr_2$, and $Na_2SO_4$, present in the range of 20 to 200 pounds per barrel;

as a suspension additive, parenchymal cell cellulose temperature-stable viscosifying bacterial cellulose products, present at a concentration of 1 to 12 pounds per barrel of brine;

as a filtration additive, a terpolymer produced from monomers of 2-acrylamido-2-methylpropanesulfonate, acrylamide, and 2-vinylpyrrolidone, present in a concentration of 1 to 20 pounds per barrel of brine; and a buffer for pH control, present at a concentration from 2 to 10 pounds per barrel of brine, such as MgO, $MgCl_2$, $Na_2CO_3$.

The treating fluid of this invention may contain additives in addition to those described above, including emulsifiers and weighting agents. The selection of additional additives will depend on the use for which the treating fluid is intended, taking into account the environmental conditions, especially temperature and pressure.

Experimental Test

The invention may be better understood by reference to the following laboratory experiments which are offered to demonstrate operability of the invention and to demonstrate the unexpected .improvements in filtration control obtained by combining the fluid components of this invention: brine solution, soluble sized-salt, and water-soluble filtration control additive, and a suspension additive. Such test examples are not intended to limit the scope of the invention as defined in the appended claims.

The following tests demonstrate the temperature stability of the fluid of this invention compared to formulations suggested in the past. In Table 1, a commercially available sized-salt technology is shown to be ineffective at temperatures above 300° F. In Tables 2 and 3 the synergistic effects between Driscal D (the composition of which is set forth below) and sized-salt is illustrated, showing the inventive combination compared to combinations with alternative solids (Table 2) and alternative polymers (Table 3). Tables 4 through 7 confirm the ranges of the additives in the preferred embodiment of the invention. Table 8 illustrates the temperature stability of the invention for up to six days and Table 9 shows the ability of a preferred embodiment to be flushed from the sides of the wellbore under laboratory conditions.

The following conditions and assumptions were used in conducting these tests.

Unless otherwise noted, all percentages are based upon weight percent and viscosities are in centipoise. Also, unless otherwise noted, the properties provided in these examples were after static-aging at a designated test temperature according to the protocol of the American Petroleum Recommended Practice Standard Procedure for Laboratory Testing Drilling Fluids (API RP 13I), Fourth Edition, Jun. 1, 1990, Supplement 2 (May 1, 1993).

The properties measured were the yield point, 6-rpm reading, and 10-second gel strength. For effective suspension properties, preferred values for these properties are as follows:

Yield Point: at least 10 lb./100 ft$^2$ (after 16 hours aging), 6-rpm reading: at least 5 (after 16 hours aging), 10-second gel strength: at least 5 lb./100 ft$^2$ (after 16 hours aging).

The pH of the mixture was measured in all tests. The pH is preferably basic to minimize degradation of the polymers used in the tests.

The other properties measured were the American Petroleum Institute (API) filtration rates and high-temperature high-pressure (HTHP) filtration rates, which are indicators of how well the fluid compositions can slow filtration into a reservoir. The HTHP filtration rate was measured at 300° F. The filtercake thickness and calculated permeability are also indicators of effective fluid loss control, with the lowest value possible being the most effective. For effective filtration control, suggested values for these properties are as follows:

API filtration rate: less than 5 cc/30 min. (after 16 hours aging),

API filtercake thickness: less than 4/32 (after 16 hours aging),

HTHP filtration rate: less than 20 cc/30 min. (after 16 hours aging),

HTHP filtercake thickness: less than 8/32 (after 16 hours aging).

Filtercake permeability was calculated according to equation 6–13 in *Composition and Properties of Drilling and Completion Fluids*, Fifth Edition by H. C. H. Darley and George R. Gray (Gulf Publishing Company, 1988).

The following briefly describes some of the materials used in the tests.

Baracarb 5, commercially available from Baroid Drilling Fluids, Inc., is a fine grind of calcium carbonate as marble;

Watesal, commercially available from TBC-Brinadd, is a fine grind of sodium chloride salt;

Driscal D, commercially available from Drilling Specialties Inc., is a terpolymer of 2-acrylamido-2-methylpropanesulfonate (AMPS), acrylamide, and 2-vinylpyrrolidone;

Cypan, commercially available from American Cyanamid Company, is a sodium acrylate polymer;

Therma-Chek, commercially available from Baroid Drilling Fluids Inc., is a copolymer of acrylate and AMPS monomers;

TekMud 1974, commercially available from Exxon Chemical Company, is a copolymer of AMPS and acrylate monomers;

Spersene, commercially available from Drilling Fluids Co., is a lignosulfonate;

Thixsal, commercially available from TBC-Brinadd, is a lower-temperature sized salt fluid, comprising Watesal, a pH buffer, cellulose, starch, and biogum viscosifier and filtration control polymers;

HP-007, commercially available from Aqualan Company, is a membrane-like cellulosic viscosifier comprising parenchymal cell cellulose.

The following examples demonstrate the unexpected low filter loss obtained with the filtration control fluid of this invention cannot be attributed to any one component. All of the components covered in the appended claims are needed.

EXAMPLE 1

Temperature Stability of Sized Salt Fluid

To test the ability of sized salt to be used as a kill weight fluid for high temperature wells, tests were performed on a sample of the commercial Thixsal system under three different conditions: at ambient temperature, after static aging for 16 hours at 300° F., and after static aging for 16 hours at 425° F. The comparison of these results is illustrated in Table 1. From an inspection of data in Table 1, it is apparent that the suspension properties of the sample at ambient temperature are almost completely destroyed by aging at 300° F., and completely destroyed by aging at 425° F. Specifically, the near-zero values for the 6-rpm Fann reading and the 10-second and 10-minute gel strengths indicate loss of suspending ability. The API filtration rates at ambient temperature and after 300° F. aging are both good, remaining between 1.8 and 2.8 cc/30 min. However, after aging at 425° F., the API rate indicates virtually no filtration control, with a value of 148 cc/30 min. Calculated filtercake permeabilities further support the complete loss of filtration control after 425 ° F. aging. For the high-temperature filtration rate measurement, the HTHP rate, filtration control had disappeared after 300° F. aging.

This example shows that degradation of Thixsal occurs in some properties by 300° F., and in all properties by 425° F., indicating that Thixsal is unsuitable for a kill weight perforating fluid or for a workover fluid in deep, hot (425° F.) wells.

TABLE 1

| Property | Temperature Stability of Sized Salt Fluid | | |
|---|---|---|---|
| | As-Received Sample | After Aging @300° F. for 16 hours | After Aging @425° F. for 16 hours |
| Plastic Viscosity (cP) | 58 | 18 | 11 |
| Yield Point (lb./100 ft²) | 112 | 5 | 3 |
| 6-rpm Fann reading | 50 | 2 | 1 |
| Gel Strength, 10"/10'/30' (lb./100 ft²) | 38/56/60 | 1/1/3 | 1/1/4 |
| pH | 9.79 | 8.01 | 8.53 |
| API Filtration Rate (cc/30 min.) | 1.8 | 2.8 | 148 |
| Filtercake thickness (in.) | <1/32 | <1/32 | >12/32 |
| Filtercake permeability (microdarcy) | 0.20 | 0.31 | 195 |
| HTHP (300° F., 500 psi) Filtration rate (cc/30 min.) | 2.0 | 156 | — |
| Filtercake thickness (in.) | 3/32 | 18/32 | — |
| Filtercake permeability (microdarcy) | 0.10 | 52.5 | — |

EXAMPLE 2

Illustration of Synergy Between Sized Salt and Driscal D Polymer Contrasted with Fine Calcium Carbonate (Calcite) Properties After Static Aging for 16 Hours at 425° F.

One aspect of this synergism, which is shown in the following data, relates to the uniqueness of the sized salt with Driscal D polymer, as compared to other fine particulate materials. In this example, tests were performed to compare the use of Driscal D with sized salt and with calcium carbonate particles (referred to as calcite, an example of an acid-soluble species). All samples were static aged at 425° F. for 16 hours. The compositions contained NaBr brine, 5 lb/bbl HP-007 except that one composition contained no HP-007, dry NaBr to saturation, 100 lb/bbl Watesal A or 100 lb/bbl Baracarb 5, 5v lb/bbl MgO, 5 lb/bbl Driscal D or no Driscal D. The data from these tests are shown in Table 2 below. As is evident from Table 2, fine sized-salt alone and fine calcite alone do not effectively reduce the room temperature (API) filtration rate of the sample, since API rates after aging are 380 and 351 cc/30 min., respectively. Driscal D by itself or with calcite showed improvement in the API rates, which were reduced to about 30 cc/30 min. However, the most effective, combination is fine salt combined with Driscal D, which measured an API rate of 7 cc/30 min. Furthermore, when the high temperature fluid loss was measured (the HTHP rate), the efficacy of the fine salt combined with Driscal D was evident, since it was three times more effective than the calcite example. The filtercake thickness and permeability data further supported the efficacy of the Driscal D/sized-salt combination.

Furthermore, the effectiveness of the Driscal D/sized-salt combination for filtration control was still evident when no PCC is added. However, the gel strength values were so low that this composition would not be useful in field operations.

EXAMPLE 3

Illustration of Uniqueness of Driscal D with Sized Salt Contrasted with other High Temperature Fluid Loss Polymers Properties after Static Aging 72 Hours at 425° F.

This example compares the effectiveness of Driscal D combined with fine sized-salt as the bridging material with other commonly used fluid loss control additives. All materials were tested under static aging for 72 hours at 425° F. The results, as illustrated in Table 3, show that Driscal D when combined with the sized salt was clearly the most effective under the severe conditions. As is evident from Table 3, only the fine sized-salt/Driscal D salt/polymer combination was capable of providing low filtration rate after static aging, both the API rate (measured at room temperature after aging) and the HTHP rate (measured at 300° F. after aging). Therma-Chek had an excessive API filtration rate. Cypan had an excessive HTHP filtration rate. Even for lignosulfonate in high concentration (Spersene in this example), both API and HTHP rates were large. These tests showed that Therma-Chek, Cypan, and Spersene would not work effectively with fine sized-salt as a filtration control additive after high temperature aging. Only copolymers of

TABLE 2

| Sample Composition | P-1 Fine Sized-Salt Only | P-2 Calcite Only | P-3 Driscal D Only | P-4 Calcite with Driscal D | P-5 Fine Salt with Driscal D | P-12 Fine Salt with Driscal D - No PCC |
|---|---|---|---|---|---|---|
| Saturated brine | NaBr | NaBr | NaBr | NaBr | NaBr | NaBr |
| PCC viscosifier | 5 lb./bbl. | 5 lb./bbl. | 5 lb./bbl. | 5 lb./bbl. | 5 lb./bbl. | 0 |
| Fine sized salt | 100 lb./bbl | 0 | 0 | 0 | 100 lb./bbl | 100 lb./bbl |
| Fine calcite | 0 | 100 lb./bbl | 0 | 100 lb./bbl | 0 | 0 |
| Driscal D | 0 | 0 | 5 lb./bbl. | 5 lb./bbl. | 5 lb./bbl. | 5 lb./bbl. |
| MgO buffer | 5 lb./bbl. | 5 lb./bbl. | 5 lb./bbl. | 5 lb./bbl. | 5 lb./bbl. | 10 lb./bbl. |
| Properties (after aging at 425° F. for 16 hours) | | | | | | |
| Plastic Viscosity (cP) | 4 | 3 | 20 | 40 | 49 | 40 |
| Yield Point (lb./100 ft$^2$) | 4 | 4 | 6 | 39 | 56 | 9 |
| 6-rpm Fann reading | 2 | 2 | 2 | 8 | 14 | 2 |
| Gel Strength, 10"/10'/30', lb./100 ft$^2$) | 2/2/3 | 2/2/2 | 1/1/2 | 4/6/6 | 6/7/9 | 1/3/7 |
| pH | 8.40 | 8.30 | 8.55 | 8.32 | 8.67 | 8.40 |
| API Filtration Rate (cc/30 min.) | 289 | 319 | 30 | 30.2 | 7.0 | 10.6 |
| Filtercake thickness (in.) | 12/32 | 10/32 | — | 7/32 | 1/32 | <1/32 |
| Filtercake permeability (microdarcy) | 380 | 351 | — | 23.2 | 0.77 | 1.06 |
| HTHP (300° F., 500 psi) Filtration Rate (cc/30 min.) | — | — | 82 | 61.4 | 22.8 | — |
| Filtercake thickness (in.) | — | — | <1/32 | 18/32 | 8/32 | — |
| Filtercake permeability (microdarcy) | — | — | 1.62 | 21.9 | 3.91 | — | the type represented by Driscal D work synergistically with fine sized-salt to produce a temperature-stable perforation and workover fluid.

TABLE 3

| Sample Compositions | P-6 Driscal D | P-7 Therma-Chek | P-8 Cypan | P-9 Spersene |
|---|---|---|---|---|
| Saturated brine | NaBr | NaBr | NaBr | NaBr |
| PCC viscosifier | 5 lb./bbl | 5 lb./bbl | 5 lb./bbl | 5 lb./bbl |
| Fine sized salt | 100 lb./bbl | 100 lb./bbl | 100 lb./bbl | 100 lb./bbl |
| MgO buffer | 5 lb./bbl | 5 lb./bbl | 5 lb./bbl | 5 lb./bbl |
| Fluid loss polymer | 5 lb./bbl | 8 lb./bbl | 5 lb./bbl | 30 lb./bbl |
| Properties (after aging at 425° F. for 72 hours) | | | | |
| Plastic Viscosity (cP) | 35 | 39 | 12 | 5 |
| Yield Point (lb./100 ft$^2$) | 12 | 20 | 6 | 10 |
| 6-rpm Fann reading | 4 | 6 | 9 | 5 |
| Gel Strengths, 10"/10'/30' (lb./100 ft$^2$) | 3/7/7 | 5/6/6 | 1/2/3 | 3/4/6 |
| pH | 8.93 | 9.07 | 8.86 | 7.12 |
| API Filtration Rate (cc/30 min.) | 4.9 | 256 | 4.8 | 126 |
| Filtercake thickness (in.) | 1.5/32 | >25/32 | 2/32 | 8/32 |
| Filtercake permeability (microdarcy) | 0.81 | ~700 | 1.06 | 111 |
| HTHP (300° F., 500 psi) Filtration Rate (cc/30 min.) | 16 | — | 445 | 367 |
| Filtercake thickness (in.) | 7/32 | — | 16/32 | 22/32 |
| Filtercake permeability (microdarcy) | 2.22 | — | 313 | 160 |

EXAMPLE 4

Effect of PCC Concentration Properties After Static Aging for 16 Hours at 425° F.

Table 4 illustrates data obtained for tests after static aging at 425° F. for 16 hours in which the PCC concentration was varied and the other components (sized-salt, Driscal D, and MgO buffer) were held constant. As is evident from Table 4, the presence of PCC is required for suspension after static aging. Sample P-12, with no PCC, had such a low Fann 6-rpm reading and such a low 10-second and 10-minute gel strength, such compositions would not provide adequate suspension. Even the 3 lb./bbl sample, P-11, had minimal suspension because the gel strengths are so low. On the other hand, 5 lb./bbl PCC, sample P-10, provided adequate suspension for 16 hours of aging at 425° F.

TABLE 4

| Compositions | P-10 5 lb./bbl PCC | P-11 3 lb./bbl PCC | P-12 0 lb./bbl PCC |
|---|---|---|---|
| Saturated brine | NaBr | NaBr | NaBr |
| PCC viscosifier | 5 | 3 | 0 |
| Fine sized salt | 100 | 100 | 100 |
| Driscal D | 5 | 5 | 5 |
| MgO Buffer | 5 | 5 | 10 |
| Properties (after aging at 425° F. for 16 hours) | | | |
| Plastic Viscosity (cP) | 50 | 51 | 40 |
| Yield Point lb./100 ft$^2$ | 64 | 36 | 9 |
| 6-rpm Fann reading | 15 | 9 | 2 |
| Gel Strengths, 10"/10'/30' (lb./100 ft$^2$) | 7/10/34 | 3/4/4 | 1/3/7 |
| pH | 8.45 | 8.46 | 8.40 |
| API Filtration Rate (cc/30 min.) | 4.7 | 4.2 | 10.6 |
| Filtercake thickness (in.) | 1/32 | 1/32 | <1/32 |
| Filtercake permeability (microdarcy) | 0.52 | 0.46 | 1.06 |
| HTHP (300° F., 500 psi) Filtration Rate (cc/30 min.) | 20 | — | — |
| Filtercake thickness (in.) | 9/32 | — | — |
| Filtercake permeability (microdarcy) | 3.56 | — | — |

EXAMPLE 5

Effect of Fine Sized-Salt Concentration Properties After Static Aging for 16 Hours at 425° F.

Table 5 illustrates data for tests after static aging at 425° F. for 16 hours, where the sized salt concentration was varied, with other components held constant. As is evident from Table 5, both 50 and 100 lb./bbl additions of fine sized-salt provided excellent reduction in fluid loss, when coupled with Driscal D. Both the API and HTHP values were within the preferred range, even after 425° F. aging. However, 200 lb./bbl of fine sized salt was too much, resulting in a very thick sample, with poor fluid loss control and an extremely thick filtercake. No HTHP measurements were made on sample P-15, because the API filtration rate was large.

aging at 425° F., a temperature typical for a hot, dry gas reservoir, even 200 lb./bbl of fine sized salt, by itself, was ineffective at slowing the fluid loss. Instead, by comparison with samples such as P-13 or P-14 of Table 5, the synergy of sized-salt with Driscal D was evident.

TABLE 5

| Compositions | P-13<br>50 lb./bbl Watesal A | P-14<br>100 lb./bbl Watesal A | P-15<br>200 lb./bbl Watesal A |
|---|---|---|---|
| Saturated brine | NaBr | NaBr | NaBr |
| PCC viscosifier | 5 lb./bbl | 5 lb./bbl | 5 lb./bbl |
| Fine sized salt | 50 lb./bbl | 100 lb./bbl | 200 lb./bbl |
| Driscal D | 5 lb./bbl | 5 lb./bbl | 5 lb./bbl |
| MgO Buffer | 5 lb./bbl | 5 lb./bbl | 5 lb./bbl |
| Properties (after aging at 425° F. for 16 hours) | | | |
| Plastic Viscosity (cP) | 38 | 50 | 159 |
| Yield Point (lb./100 ft$^2$) | 29 | 64 | 73 |
| 6-rpm Fann reading | 5 | 15 | 60 |
| Gel Strengths, 10"/10'/30' (lb/100 ft$^2$) | 3/4/4 | 7/10/34 | 55/65/65 |
| pH | 8.51 | 8.45 | 8.63 |
| API Filtration Rate (cc/30 min.) | 5.6 | 4.7 | 39 |
| Filtercake thickness (in.) | <1/32 | 1/32 | 20/32 |
| Filtercake permeability (microdarcy) | 0.56 | 0.52 | 85.8 |
| HTHP (300° F., 500 psi) Filtration Rate (cc/30 min.) | 19 | 20 | — |
| Filtercake thickness (in.) | 2/32 | 9/32 | — |
| Filtercake permeability (microdarcy) | 0.75 | 3.56 | — |

EXAMPLE 6

Inefficacy of Fine Sized Salt without Driscal D Polymer Properties After Static Aging for 16 Hours at 425° F.

Table 6 illustrates data similar to that in Table 5, except that in this example no Driscal D had been added. In this case, even with 200 lb./bbl of fine sized-salt, the fluid loss properties were very poor after static aging for 16 hours at 425° F. No data was obtained for any HTHP filtration rate measurements because the API filtration rates were so large.

The data further illustrates the ineffectiveness of sized salt alone to provide a minimal loss of fluid into a reservoir. After

TABLE 6

| Compositions | P-16<br>100 lb./bbl Watesal A | P-17<br>200 lb./bbl Watesal A | P-18<br>200 lb./bbl Watesal A |
|---|---|---|---|
| Saturated brine | NaBr | NaBr | NaBr |
| PCC viscosifier | 5 lb./bbl | 7.5 lb./bbl | 10 lb./bbl |
| Fine sized salt | 100 lb./bbl | 200 lb./bbl | 200 lb./bbl |
| Driscal D | 0 | 0 | 0 |

TABLE 6-continued

| Compositions | P-16<br>100 lb./bbl Watesal A | P-17<br>200 lb./bbl Watesal A | P-18<br>200 lb./bbl Watesal A |
|---|---|---|---|
| MgO Buffer | 5 lb./bbl | 10 lb./bbl | 10 lb./bbl |
| Properties<br>(after aging at 425° F.<br>for 16 hours) | | | |
| Plastic Viscosity (cP) | 10 | 13 | 20 |
| Yield Point (lb./100 ft$^2$) | 0 | 34 | 41 |
| 6-rpm Fann reading | 2 | 35 | 42 |
| Gel Strengths, 10"/10'/30'<br>(lb./100 ft$^2$) | 2/2/3 | 33/37/36 | 35/40/39 |
| pH | 8.65 | 8.86 | 9.00 |
| API Filtration Rate<br>(cc/30 min.) | 322 | 55.2 | 76.1 |
| Filtercake thickness (in.) | 15/32 | 14/32 | 19/32 |
| Filtercake permeability<br>(Microdarcy) | 531 | 85 | 159 |

EXAMPLE 7

Effect of Different Driscal D Concentrations After Static Aging for 16 Hours at 425° F.

Table 7 illustrates data showing the variation in properties of samples with different concentrations of Driscal D with other fluid variables held constant. A gradual decrease in both the API and HTHP filtration rates was obtained for samples P-19 through P-21, as Driscal D concentration was increased from 3 to 7lb./bbl. However, when Driscal D was added at 9 lb./bbl, as in sample P-22, the HTHP filtration rate increased. Thus, for this formulation, an upper limit of 7 lb./bbl Driscal D would be preferred. For a different formulation, however, such as one with less fine sized-salt, 9 lb./bbl Driscal D or other suitable polymer could still be effective.

EXAMPLE 8

Effect of Longer Term Aging of Perforation/Workover Fluid Properties

Table 8 illustrates examples of the effect of longer term static aging upon the properties of a formulation of the perforation/workover fluid of this invention. Three samples of P-23 were static aged in parallel at 72, 110, and 144 hours at 425° F. These samples contained a small amount of TekMud 1974 for the longer term aging. The data shows that over longer aging periods, the suspension properties of the sample decreased, but began to reach an equilibrium value after about 110 hours. On the other hand, the fluid loss properties continued to degrade. However, when the HTHP filtration rates are integrated over the entire six day period, the values are a significant improvement over sized-salt alone.

TABLE 7

| Compositions | P-19<br>3 lb./bbl<br>Driscal D | P-20<br>5 lb./bbl<br>Driscal D | P-21<br>7 lb./bbl<br>Driscal D | P-22<br>9 lb./bbl<br>Driscal D |
|---|---|---|---|---|
| Saturated brine | NaBr | NaBr | NaBr | NaBr |
| PCC viscosifier | 5 lb./bbl | 5 lb./bbl | 5 lb./bbl | 5 lb./bbl |
| Fine sized salt | 100 lb./bbl | 100 lb./bbl | 100 lb./bbl | 100 lb./bbl |
| Driscal D | 3 lb./bbl | 5 lb./bbl | 7 lb./bbl | 9 lb./bbl |
| MgO buffer | 5 lb./bbl | 5 lb./bbl | 5 lb./bbl | 5 lb./bbl |
| Properties<br>(after aging at 425° F.<br>for 16 hours) | | | | |
| Plastic Viscosity (cP) | 53 | 50 | 64 | 81 |
| Yield Point<br>(lb./100 ft$^2$) | 27 | 64 | 52 | 59 |
| 6-rpm Fann reading | 13 | 15 | 9 | 10 |
| Gel Strengths,<br>10"/10'/30'<br>(lb./100 ft$^2$) | 8/10/13 | 7/10/34 | 5/5/21 | 5/8/8 |
| pH | 8.55 | 8.45 | 8.70 | 8.75 |
| API Filtration Rate<br>(cc/30 min.) | 15.2 | 4.7 | 4.0 | 3.6 |
| Filtercake thickness (in.) | 1/32 | 1/32 | 1/32 | 1/32 |
| Filtercake permeability<br>(microdarcy) | 1.67 | 0.52 | 0.44 | 0.40 |
| HTHP (300° F., 500 psi)<br>Filtration Rate (cc/30 min.) | 48 | 20 | 9.2 | 62 |
| Filtercake thickness (in.) | 10/32 | 9/32 | 4/32 | 10/32 |
| Filtercake permeability<br>(microdarcy) | 9.5 | 3.56 | 0.73 | 12.3 |

TABLE 8

| Compositions | P-23A 72 hrs. Static Aging | P-23B 110 hrs. Static Aging | P-23C 144 hrs. Static Aging |
|---|---|---|---|
| Saturated brine | NaBr | NaBr | NaBr |
| PCC viscosifier | 5 lb./bbl | 5 lb./bbl | 5 lb./bbl |
| Fine sized salt | 100 lb./bbl | 100 lb./bbl | 100 lb./bbl |
| Fluid loss polymers | 4 lb./bbl Driscal D 1.25 lb./bbl TekMud 1974 | 4 lb./bbl Driscal D 1.25 lb./bbl TekMud 1974 | 4 lb./bbl Driscal D 1.25 lb./bbl TekMud 1974 |
| MgO Buffer | 5 lb./bbl | 5 lb./bbl | 5 lb./bbl |
| Properties | | | |
| Plastic Viscosity (cP) | 80 | 48 | 45 |
| Yield Point (lb./100 ft$^2$) | 61 | 53 | 47 |
| 6-rpm Fann reading | 34 | 27 | 22 |
| Gel Strengths, 10"/10'/30' (lb./100 ft$^2$) | 20/30/39 | 14/20/30 | 16/26/23 |
| pH | 8.97 | 8.95 | 8.93 |
| API Filtration Rate (cc/30 min.) | 5.6 | 8.6 | 28.8 |
| Filtercake thickness (in.) | 5/32 | 5/32 | 9/32 |
| Filtercake permeability (microdarcy) | 0.62 | 0.95 | 2.88 |
| HTHP (300° F., 500 psi) Filtration Rate (cc/30 min.) | 34 | 40 | 70 |
| Filtercake thickness (in.) | 1/32 | 1/32 | 2/32 |
| Filtercake permeability (microdarcy) | 3.37 | 3.96 | 12.5 |

EXAMPLE 9

Ability of Salt/Polymer Filtercake to be Flushed from Rock

Sample P-1 that had been static aged for 16 hours at 425° F. was used to form an HTHP filtercake across a piece of core material. The HTHP test was done at 300° F. and 500 psi differential pressure, to form the filtercake. The volume of the filtercake was estimated by measuring the thickness and the diameter of the filtercake, and using the mathematical formula for a cylinder. It was determined to be about 30 cc. Freshwater was added in single volume increments, equal to the filtercake volume, until the filtercake began to dissolve. After each water addition, 10 minutes was allowed for dissolution to occur. Filtercake thickness was monitored as a measure of dissolution. After the last addition, mild vibration was applied by placing the core against a small laboratory vortex mixer for 10 seconds. This latter step was designed to imitate turbulence from circulating inside casing or from the high pressure gas influx.

As illustrated in Table 9, the filtercake that had been deposited at room temperature can be successfully removed with a combination of dilution and vibration. The final dilution ratio was still only 1:7, resulting in a brine concentration of 9 wt %. Thus, complete dissolution in freshwater was not required; rather, an intermediate brine concentration sufficed.

TABLE 9

| Volume Tapwater Added (cc) | Cumulative Volume (cc) | Dilution Ratio | Cumulative Time Elapsed (min.) | Cake Thickness (in.) |
|---|---|---|---|---|
| 0 | 0 | saturated or 48.6 wt % | 0 | 7/32 |
| 30 | 30 | 1:1 or 29 wt % | 10 | 4.5 |
| 30 | 60 | 1:2 or 21 wt % | 20 | 3.0 |
| 30 | 90 | 1:3 or 16 wt % | 30 | 2.0 |
| 30 | 120 | 1:4 or 13.5 wt % | 40 | 1.5 |
| 30 | 150 | 1.5 or 11.5 wt % | 50 | 1.5 |
| 30 | 180 | 1:6 or 10 wt % | 60 | 1.5 |
| 30 | 210 | 1:7 or 9 wt % | 70 | 1.5 |
| Vibrate for 10 seconds | | | | 0.0 |

The principle of the invention and the best mode in which it is contemplated to apply that principle have been described. It is to be understood that the foregoing is illustrative only and that other means and techniques can be used without departing from the true scope of the invention defined in the following claims.

What is claimed is:

1. A method comprising introducing into a wellbore a fluid produced from a saturated brine solution, a water soluble sized salt that is insoluble in the saturated brine solution, a water-soluble polymer produced from at least two monomers of 2-acrylamido-2-methylpropanesulfonate, acrylamide, or 2-vinylpyrrolidone, where said fluid is exposed to temperatures above 400° F.

2. A method comprising introducing into a wellbore a fluid produced from a saturated brine solution consisting essentially of potassium chloride, sodium chloride, calcium chloride, sodium sulfate, sodium carbonate, sodium bicarbonate, calcium bromide, sodium bromide, potassium bromide, magnesium bromide, potassium carbonate, and mixtures thereof; a water soluble sized salt that is insoluble in the saturated brine solution, said sized salt consisting essentially of potassium chloride, sodium chloride, calcium chloride, sodium sulfate, sodium carbonate, sodium bicarbonate, calcium bromide, sodium bromide, potassium bromide, magnesium bromide, potassium carbonate, and mixtures thereof; a water-soluble filtration additive comprising a polymer composition produced from two monomers of 2-acrylamido-2-methylpropanesulfonate, acrylamide, or 2-vinylpyrrolidone; a viscosifier and suspension additive comprising parenchymal cell cellulose; and a buffer for pH control, where said fluid is exposed to temperatures above 400° F.

* * * * *